United States Patent
Lee et al.

(10) Patent No.: US 11,939,425 B2
(45) Date of Patent: Mar. 26, 2024

(54) POLYESTER RESIN

(71) Applicant: SK CHEMICALS CO., LTD., Gyeonggi-do (KR)

(72) Inventors: Yoo Jin Lee, Gyeonggi-do (KR); Su-Min Lee, Seoul (KR); Sung-Gi Kim, Gyeonggi-do (KR); Min-Young Han, Gyeonggi-do (KR); Dong-jin Han, Gyeonggi-do (KR)

(73) Assignee: SK Chemicals Co., Ltd., Gyeonggi-do (KR)

( * ) Notice: Subject to any disclaimer, the term of this patent is extended or adjusted under 35 U.S.C. 154(b) by 0 days.

(21) Appl. No.: 17/029,822

(22) Filed: Sep. 23, 2020

(65) Prior Publication Data
US 2021/0017331 A1    Jan. 21, 2021

Related U.S. Application Data

(62) Division of application No. 16/078,207, filed as application No. PCT/KR2017/003438 on Mar. 29, 2017, now abandoned.

(30) Foreign Application Priority Data

Apr. 6, 2016   (KR) .................. 10-2016-0042407

(51) Int. Cl.
C08G 63/672   (2006.01)
C08G 63/183   (2006.01)
C08G 63/78    (2006.01)
C08G 63/80    (2006.01)

(52) U.S. Cl.
CPC ......... *C08G 63/672* (2013.01); *C08G 63/183* (2013.01); *C08G 63/78* (2013.01); *C08G 63/80* (2013.01); *C08G 2390/00* (2013.01)

(58) Field of Classification Search
CPC ............. C08G 2390/00; C08G 63/183; C08G 63/672; C08G 63/78; C08G 63/80
See application file for complete search history.

(56) References Cited

U.S. PATENT DOCUMENTS

| | | | | |
|---|---|---|---|---|
| 5,959,066 A | * | 9/1999 | Charbonneau | C08G 63/672 528/271 |
| 6,140,422 A | * | 10/2000 | Khanarian | C08L 71/00 525/437 |
| 2004/0092703 A1 | * | 5/2004 | Germroth | C08G 63/672 528/307 |
| 2011/0297222 A1 | * | 12/2011 | Takegami | C08J 5/18 524/400 |
| 2014/0100350 A1 | * | 4/2014 | He | C08G 63/87 528/274 |
| 2014/0288241 A1 | * | 9/2014 | Park | C08L 67/04 525/173 |
| 2015/0141612 A1 | * | 5/2015 | Lee | C08G 63/183 528/298 |
| 2021/0017331 A1 | * | 1/2021 | Lee | C08G 63/183 |

FOREIGN PATENT DOCUMENTS

KR   WO2013/176467   * 11/2013
KR   20130132138     * 12/2013

OTHER PUBLICATIONS

J.M.Koo et al "Structural and thermal properties of poly(1,4-cyclohexane dimethylene terephthalate) containing isosorbide", Polym. Chem., 2015, 6, pp. 6973-6986 (Year: 2015).*
TH. Rieckmann et al "Poly(Ethylene Terephthalate) Polymerization—Mechanism, Catalysis, Kinetics, Mass Transfer and Reactor Design", Chapter II, Modern Polyesters: Chemistry and Technology of Polyesters and Copolyesters. 2003, pp. 32-115 (Year: 2003).*

* cited by examiner

*Primary Examiner* — Frances Tischler
*Assistant Examiner* — Gennadiy Mesh
(74) *Attorney, Agent, or Firm* — Sheridan Ross P.C.

(57) ABSTRACT

The present invention relates to a polyester resin. The polyester resin is useful for bottles, sheets, multilayer sheets, stretched films and fiber applications due to excellent heat resistance and transparency, and in particular, the polyester resin has little deterioration of physical properties such as yellowing, etc., during processing. A process for making the polyester resin includes an esterification reaction between a dicarboxylic acid that includes terephthalic acid and a diol that includes isosorbide in the presence of a catalyst, followed by a polycondensation reaction on a product of the esterification reaction. In some embodiments, an initial mixing ratio of the dicarboxylic acid and the diol is between 1:1.02 and 1:1.04.

7 Claims, No Drawings

POLYESTER RESIN

CROSS-REFERENCE TO RELATED APPLICATIONS

This application is a divisional application of U.S. patent application Ser. No. 16/078,207, filed 21 Aug. 2018, which is a national stage application under 35 U.S.C. § 371 and claims the benefit of PCT Application No. PCT/KR2017/003438 having an international filing date of 29 March 2017, which designated the U.S., which PCT application claimed the benefit of the Republic of Korea Application No. 10-2016-0042407, filed 6 Apr. 2016, the disclosures of each of which are incorporated herein by reference.

TECHNICAL FIELD

The present invention relates to a polyester resin.

BACKGROUND ART

Polyethylene terephthalate (PET) which is representative of polyester resins, is widely used commercially due to low cost and excellent physical/chemical properties. However, since the PET has a high crystallinity, a high temperature is required during processing and transparency of molded products is deteriorated. Further, there is a problem in that a shape of a bottle molded by using PET is deformed during a high temperature filling process of the beverage since the PET has poor heat resistance.

In order to prevent the problem, an attempt has been made to increase the heat resistance of the bottle through a bottleneck crystallization process and a heat setting process before and after the bottle molding, but the transparency of the bottle is decreased. A polyester resin in which isosorbide is copolymerized to obtain high heat resistance and low crystallinity has been proposed. Isosorbide has a rigid molecular structure. Thus, when the isosorbide is used instead of ethylene glycol, it is possible to improve a glass transition temperature. Further, when a content of the isosorbide is increased, the glass transition temperature may be accordingly increased.

The isosorbide not only improves the heat resistance but also decreases a crystallization rate. In the case of a PET obtained by polymerizing a terephthalic acid and ethylene glycol, the crystallization rate is fast due to high regularity of molecules.

However, by introducing the isosorbide into a polymer main chain, the regularity of the molecules is lowered, and thus, the crystallization rate is low. Further, when a content of the isosorbide is increased, a crystalline polymer is changed to an amorphous polymer. However, the polyester resin into which the isosorbide is introduced into the polymer main chain may cause deterioration of physical properties such as yellowing, etc., during molding, and thus, it is recommended to work at a temperature as low as possible. Therefore, a technology of improving moldability by adding an antioxidant, or the like, to a polyester resin into which isosorbide is introduced has been suggested, but it is demanded to develop a technology capable of fundamentally improving the moldability of the polyester resin into which the isosorbide is introduced.

DISCLOSURE

Technical Problem

The present invention has been made in an effort to provide a polyester resin having advantages of little deterioration of physical properties such as yellowing, etc., after molding.

Technical Solution

An exemplary embodiment of the present invention provides a polyester resin having a structure in which a dicarboxylic acid or a derivative thereof that includes a terephthalic acid or a derivative thereof, and a diol that includes isosorbide are polymerized so that an acid moiety derived from the dicarboxylic acid or the derivative thereof and a diol moiety derived from the diol are repeated, wherein the diol moiety derived from the isosorbide has a content of 0.5 to 20 mol % with respect to a total diol moiety derived from the diol, and when a standard solution in which isosorbide is dissolved in chloroform at a concentration of 150 μg/mL, and a resin solution obtained by dissolving a component extracted from 0.5 g of the polyester resin in 5 mL of chloroform using a solvent in which cyclohexane and isopropyl alcohol are mixed at a volume ratio of 2.5:97.5, are analyzed by gas chromatography, respectively, a peak area ratio of a peak of the resin solution confirmed at the same retention time to a peak confirmed in the analysis of the standard solution (peak area of the resin solution/peak area of the standard solution) is 1.0 or less.

Advantageous Effects

The polyester resin according to an embodiment of the present invention is useful for bottles, sheets, multilayer sheets, stretched films and fiber applications due to excellent heat resistance and transparency, and in particular, the polyester resin has little deterioration of physical properties such as yellowing, etc., during processing.

MODE FOR INVENTION

Hereinafter, a polyester resin according to a specific embodiment of the present invention, and a manufacturing method thereof, etc., are described.

According to an exemplary embodiment of the present invention, there is provided a polyester resin having a structure in which a dicarboxylic acid or a derivative thereof that includes a terephthalic acid or a derivative thereof, and a diol that includes isosorbide are polymerized so that an acid moiety derived from the dicarboxylic acid or the derivative thereof and a diol moiety derived from the diol are repeated, wherein the diol moiety derived from the isosorbide has a content of 0.5 to 20 mol % with respect to a total diol moiety derived from the diol, and when a standard solution in which isosorbide is dissolved in chloroform at a concentration of 150 μg/mL, and a resin solution obtained by dissolving a component extracted from 0.5 g of the polyester resin in 5 mL of chloroform using a solvent in which cyclohexane and isopropyl alcohol are mixed at a volume ratio of 2.5:97.5, are analyzed by gas chromatography, respectively, a peak area ratio of a peak of the resin solution confirmed at the same retention time to a peak confirmed in the analysis of the standard solution (peak area of the resin solution/peak area of the standard solution) is 1.0 or less.

In order to solve a problem in that a polyester resin in which isosorbide is introduced into a polymer main chain according to the related art, a method of moderately controlling molding process conditions or a method of adding an antioxidant, or the like, to the polyester resin has been attempted. However, by these methods, it is not possible to obtain a polymer product that achieves a desired level of general performance.

Accordingly, the present inventors found that when a polyester resin satisfying a specific peak area ratio on gas chromatography analysis result as described above is provided (i.e., when a content of isosorbide remaining in the polyester resin is decreased), deterioration of physical properties, for example, discoloration, etc., during molding could be remarkably improved, and completed the present invention.

Hereinafter, a manufacturing method of the polyester resin is described in detail.

The polyester resin may be manufactured by including (a) performing an esterification reaction or a transesterification reaction on (i) a dicarboxylic acid or a derivative thereof that includes a terephthalic acid or a derivative thereof and (ii) a diol including 0.5 to 25 mol % of isosorbide with respect to a total diol; and (b) performing a polycondensation reaction on a product obtained by the esterification reaction or the transesterification reaction.

More specifically, the polyester resin is obtained by (a) performing an esterification reaction or a transesterification reaction on (i) the dicarboxylic acid or the derivative thereof and (ii) the diol at a pressure of 0 to 10.0 kgf/cm$^2$ (absolute pressure of 0 to 7355.6 mmHg) and a temperature of 150 to 300° C. for an average residence time of 1 to 24 hours, and (b) performing a polycondensation reaction on a product obtained by the esterification reaction or the transesterification reaction under a reduced pressure of 400 to 0.01 mmHg and a temperature of 150 to 300° C. for an average residence time of 1 to 24 hours.

Here, the manufacturing method of the polyester resin may be performed in batch, semi-continuous or continuous manner. The esterification reaction or the transesterification reaction and the polycondensation reaction are preferably performed in an inert gas atmosphere, and the polyester resin and other additives may be mixed by simple mixing or by extrusion. In addition, a solid-phase reaction is subsequently performed, if necessary. After (c) performing crystallization at 110° C. to 210° C. on a pellet prepared by the polycondensation reaction (melt polymerization), (d) the solid-phase reaction may be performed under an inert gas atmosphere such as nitrogen, carbon dioxide, argon, etc., or under a reduced pressure of 400 to 0.01 mmHg and at a temperature of 180 to 220° C. for an average residence time of 1 to 150 hours.

As used herein, the term 'dicarboxylic acid or a derivative thereof' means at least one compound selected from a dicarboxylic acid and derivatives of the dicarboxylic acid. In addition, the term 'derivative of the dicarboxylic acid' means a dicarboxylic acid alkyl ester (C1-C4 lower alkyl ester such as monomethyl ester, monoethyl ester, dimethyl ester, diethyl ester, dibutyl ester, or the like) or a dicarboxylic acid anhydride. Accordingly, for example, the terephthalic acid or the derivative thereof is commonly called a compound that reacts with a diol to form a terephthaloyl moiety, such as terephthalic acid; monoalkyl or dialkyl terephthalate; and terephthalic acid anhydride.

A terephthalic acid or a derivative thereof is mainly used as (i) the dicarboxylic acid or the derivative thereof. Specifically, the terephthalic acid or the derivative thereof may be used alone as (i) the dicarboxylic acid or the derivative thereof. Further, (i) the dicarboxylic acid or the derivative thereof may be used by mixing the terephthalic acid or the derivative thereof with at least one selected from the group consisting of a C8-C14 aromatic dicarboxylic acid or a derivative thereof and a C4-C12 aliphatic dicarboxylic acid or a derivative thereof as the dicarboxylic acid or the derivative thereof other than the terephthalic acid or the derivative thereof. Examples of the C8-C14 aromatic dicarboxylic acid or the derivative thereof may include aromatic dicarboxylic acids or derivatives thereof that are generally used in manufacture of the polyester resin, for example, naphthalene dicarboxylic acid such as isophthalic acid, dimethyl isophthalate, phthalic acid, dimethyl phthalate, phthalic acid anhydride, 2,6-naphthalene dicarboxylic acid, etc., dialkylnaphthalene dicarboxylates such as dimethyl 2,6-naphthalene dicarboxylate, etc., diphenyl dicarboxylic acid, etc. Examples of the C4-C12 aliphatic dicarboxylic acid or the derivative thereof may include linear, branched or cyclic aliphatic dicarboxylic acids or derivatives thereof that are generally used in manufacture of the polyester resin such as cyclohexane dicarboxylic acids such as 1,4-cyclohexane dicarboxylic acid, and 1,3-cyclohexane dicarboxylic acid, etc., cyclohexane dicarboxylate such as dimethyl 1,4-cyclohexane dicarboxylate, and dimethyl 1,3-cyclohexane dicarboxylate, etc., sebacic acid, succinic acid, isodecylsuccinic acid, maleic acid, maleic anhydride, fumaric acid, adipic acid, glutaric acid, azelaic acid, etc.

The (i) dicarboxylic acid or the derivative thereof may include 50 mol % or more, 60 mol % or more, 70 mol % or more, 80 mol % or more or 90 mol % or more of the terephthalic acid or the derivative thereof with respect to a total of (i) the dicarboxylic acid or the derivative thereof. Further, (i) the dicarboxylic acid or the derivative thereof may include 0 to 50 mol %, more than 0 mol % to 50 mol % or less, or 0.1 to 40 mol % of a dicarboxylic acid or a derivative thereof other than the terephthalic acid or the derivative thereof, with respect to a total of (i) the dicarboxylic acid or the derivative thereof. Within the above-described content range, it is possible to manufacture a polyester resin that implements appropriate general physical properties.

Meanwhile, the isosorbide (1,4:3,6-dianhydroglucitol) is used so that the diol moiety derived from the isosorbide has a content of 0.5 to 20 mol % with respect to a total diol moiety derived from the diol of the manufactured polyester resin. More specifically, the isosorbide may be used so that the diol moiety derived from the isosorbide is 1 to 20 mol % or 2 to 20 mol % with respect to the total diol moiety derived from the diol of the manufactured polyester resin. Within the above-described range, it is possible to manufacture a polyester resin that exhibits appropriate crystallinity and heat resistance.

The (ii) diol may include compounds that are generally used in manufacture of the polyester resin as diols other than the isosorbide, and for example, may include C8-C40 or C8-C33 aromatic diol, C2-C20 or C2-C12 aliphatic diol, or a mixture thereof, etc.

Specific examples of the aromatic diol may include ethylene oxide and/or propylene oxide-added bisphenol A derivative(polyoxyethylene-(n)-2,2-bis(4-hydroxyphenyl) propane, ethylene oxide and/or propylene oxide-added polyoxypropylene-(n)-2,2-bis(4-hydroxyphenyl)propane or ethylene oxide and/or propylene oxide-added polyoxypropylene-(n)-polyoxyethylene-(n)-2,2-bis(4-hydroxyphenyl)propane such as polyoxyethylene-(2.0)-2,2-bis(4-hydroxyphenyl)propane, polyoxypropylene-(2.0)-2,2-bis(4-hydroxyphenyl)propane, polyoxypropylene-(2.2)-polyoxyethylene-(2.0)-2,2-bis(4-hydroxyphenyl)propane, polyoxyethylene-(2.3)-2,2-bis(4-hydroxyphenyl)propane, polyoxypropylene-(6)-2,2-bis(4-hydroxyphenyl) propane, polyoxypropylene-(2.3)-2,2-bis(4-hydroxyphenyl)propane, polyoxypropylene-(2.4)-2,2-bis(4-hydroxyphenyl)propane, polyoxypropylene-(3.3)-2,2-bis(4-hydroxyphenyl)propane, polyoxyethylene-(3.0)-2,2-bis(4-hydroxyphenyl)propane, polyoxyethylene-(6)-2,2-bis(4-hydroxyphenyl)propane, etc., wherein n is the number of polyoxyethylene or polyoxypropylene units. Specific examples of the aliphatic diol may include linear, branched or cyclic aliphatic diols such as ethylene glycol, diethylene glycol, triethylene glycol, propanediol (1,2-propanediol, 1,3-propanediol, etc.), 1,4-butanediol, pentanediol, hexanediol (1,6-hexanediol, etc.), neopentyl glycol (2,2-dimethyl-1,3-propanediol), 1,2-cyclohexanediol, 1,4-cyclohexanediol, 1,2-cyclohexanedimethanol, 1,3-cyclohexanedimethanol, 1,4-cyclohexanedimethanol, tetramethyl cyclobutanediol, etc. The (ii) diol may include the above-listed diols alone or in combination of two or more thereof, in addition to the isosorbide. For example, the diol may include, in addition to the isosorbide, ethylene glycol, 1,4-cyclohexanedimethanol, polyoxyethylene-(2.0)-2,2-bis(4-hydroxyphenyl)propane, and the like, alone or in combination of two or more thereof. In (ii) the diol, a main component of the remaining diol other than isosorbide is preferably ethylene glycol. A content of the other diol used for improving physical properties, in addition to ethylene glycol, may be, for example, adjusted to 0 to 50 mol % or 0.1 to 30 mol %, with respect to a total of (ii) the diol.

In order to manufacture the polyester resin according to the exemplary embodiment of the present invention, a molar ratio of (ii) the diol to (i) the dicarboxylic acid or the derivative thereof needs to be adjusted before starting the reaction. As described above, by adjusting an initial content at which (i) the dicarboxylic acid or the derivative thereof and (ii) the diol are added, that is, the content added before the reaction starts, it is possible to provide a polyester resin satisfying the above-described specific peak area ratio.

Specifically, when a dicarboxylic acid is used as (i) the dicarboxylic acid or the derivative thereof, an initial mixing molar ratio of (i) the dicarboxylic acid or derivative thereof and (ii) the diol may be adjusted to 1:1.01 to 1.04, and when a dicarboxylic acid alkyl ester or a dicarboxylic acid anhydride is used as (i) the dicarboxylic acid or the derivative thereof, the initial mixing molar ratio of (i) the dicarboxylic acid or the derivative thereof and (ii) the diol may be adjusted to 1:2.0 to 1:2.1.

By adjusting the content of (i) the dicarboxylic acid or the derivative thereof and the content of (ii) the diol as described above, it is possible to provide a polyester resin in which the above-described specific peak area ratio is satisfied, a content of the dicarboxylic acid or the derivative thereof and the isosorbide remaining in the resin is remarkably reduced, thereby having excellent transparency, and little deterioration of physical properties such as yellowing, etc., at the time of molding. Here, the specific molar ratio of (i) the dicarboxylic acid or the derivative thereof and (ii) the diol may be satisfied at the beginning of the reaction, and if necessary, (i) the dicarboxylic acid or the derivative thereof and/or (ii) the diol may be added during the reaction. Even if a total used content is out of the above-described specific molar ratio range due to (i) the dicarboxylic acid or the derivative thereof and/or (ii) the diol added during the reaction, when the molar ratio of (i) the dicarboxylic acid or the derivative thereof and (ii) the diol satisfies the above-described range at the beginning of the reaction, it is possible to provide a desired polyester resin, that is, a polyester resin satisfying the specific peak area ratio.

In (a) the esterification reaction or the transesterification reaction, a catalyst may be used. Examples of the catalyst may include sodium methylate, magnesium methylate; acetates, borates, fatty acid salts and carbonates of Zn, Cd, Mn, Co, Ca and Ba, etc.; oxides of metal Mg; Pb, Zn, Sb, Ge, etc.

The (a) esterification reaction or the transesterification reaction may be performed in batch, semi-continuous or continuous manner. Each of raw materials may be added separately, but is preferably added in a slurry form in which the dicarboxylic acid or the derivative thereof is mixed in the diol.

A polycondensation catalyst, a stabilizer, a coloring agent, a crystallizer, an antioxidant, a branching agent, or the like, may be added to the slurry before (a) the esterification reaction or the transesterification reaction starts or to the product after (a) the esterification reaction or the transesterification reaction is completed.

However, the timing of adding the additives is not limited thereto, and may be applied at any time during the manufacture the polyester resin. As the polycondensation catalyst, one or more of general titanium, germanium, antimony, aluminum, tin compounds, etc., may be suitably selected and used. Examples of useful titanium-based catalyst may include tetraethyl titanate, acetyltripropyl titanate, tetrapropyl titanate, tetrabutyl titanate, polybutyl titanate, 2-ethylhexyl titanate, octylene glycol titanate, lactate titanate, triethanolamine titanate, acetylacetonate titanate, ethylacetoacetic ester titanate, isostearyl titanate, titanium dioxide, titanium dioxide/silicon dioxide copolymer, and titanium dioxide/zirconium dioxide copolymer, etc. In addition, examples of useful germanium-based catalyst may include germanium dioxide and a copolymer thereof, etc. As the stabilizer, a phosphorus-based compound such as phosphoric acid, trimethylphosphate, triethylphosphate, etc., may be generally used. An added content thereof is 10 to 200 ppm based on a phosphorus element amount relative to the weight of the final polymer (polyester resin). When the added content of the stabilizer is less than 10 ppm, a stabilizing effect is not sufficient, and a color of the polymer may turn yellow. When the added content thereof is more than 200 ppm, a polymer having a desired high degree of polymerization may not be obtained. Further, examples of the coloring agent to be added for improving a color of the polymer may include general coloring agents such as cobalt acetate and cobalt propionate, etc. An added content of the coloring agent is 10 to 200 ppm based on a cobalt element amount relative to the weight of the final polymer (polyester resin). If necessary, an anthraquionone-based compound, a perinone-based compound, an azo-based compound, a methine-based compound, etc., may be used as a coloring agent for an organic compound. Examples of commercially available products may include a toner such as Polysynthren Blue RLS from Clarient Corp., Solvaperm Red BB from Clarient Corp., etc. The added content of the coloring agent for the organic compound may be adjusted to 0 to 50 ppm relative to the weight of the final polymer. When the coloring agent is used at a content beyond the above-described range, a yellow color of the polyester resin may not be sufficiently blocked or physical properties may be deteriorated.

Examples of the crystallizer may include a crystal nucleating agent, an ultraviolet absorber, a polyolefin-based resin, a polyamide resin, etc. Examples of the antioxidant may include a hindered phenol-based antioxidant, a phosphate-based antioxidant, a thioether-based antioxidant, or a mixture thereof, etc. The branching agent is a general branching agent having three or more functional groups, and for example, may include trimellitic anhydride, trimethylol propane, trimellitic acid, or a mixture thereof, etc.

The (a) esterification reaction may be performed at a temperature of 200 to 300° C. or 230 to 280° C. and a pressure of 0 to 10.0 kgf/cm² (0 to 7355.6 mmHg), 0 to 5.0 kgf/cm² (0 to 3677.8 mmHg) or 0.1 to 3.0 kgf/cm² (73.6 to 2206.7 mmHg). In addition, (a) the transesterification reaction may be performed at a temperature of 150 to 270° C. or 180 to 260° C. and a pressure of 0 to 5.0 kgf/cm² (0 to 3677.8 mmHg) or 0.1 to 3.0 kgf/cm² (73.6 to 2206.7 mmHg). Here, the pressures outside the parentheses mean a gauge pressure (expressed in kgf/cm²), and the pressures in the parentheses mean an absolute pressure (expressed in mmHg).

When the reaction temperature and the pressure are out of the above-described range, physical properties of the polyester resin may be deteriorated. The reaction time (average residence time) is usually 1 to 24 hours or 2 to 8 hours, and may be varied depending on the reaction temperature, the pressure, and the molar ratio of the diol to the dicarboxylic acid or the derivative thereof to be used.

The product obtained through the esterification reaction or the transesterification reaction may be manufactured into a polyester resin having a higher degree of polymerization through the polycondensation reaction. In general, the polycondensation reaction is performed at a temperature of 150 to 300° C., 200 to 290° C., or 260 to 290° C. and at a reduced pressure of 400 to 0.01 mmHg, 100 to 0.05 mmHg or 10 to 0.1 mmHg. Here, the pressure means a range of an absolute pressure. The reduced pressure of 400 to 0.01 mmHg is to remove glycol, etc., that are by-products of the polycondensation reaction and the isosorbide, etc., that are unreacted materials. Accordingly, when the reduced pressure condition is out of the above-described range, the by-products and the unreacted materials may not be sufficiently removed. In addition, when the reaction temperature for the polycondensation reaction is out of the above-described range, physical properties of the polyester resin may be deteriorated. The polycondensation reaction is performed for a necessary time until the desired intrinsic viscosity is reached, for example for an average residence time of 1 to 24 hours.

In order to reduce the content of the unreacted materials such as the isosorbide, etc., remaining in the polyester resin, the unreacted raw materials may be discharged out of the system by intentionally maintaining the vacuum reaction long at the end of the esterification reaction or the transesterification reaction or at the beginning of the polycondensation reaction, that is, in a state in which the viscosity of the resin is not sufficiently high. When the viscosity of the resin is increased, the raw materials remaining in a reactor are difficult to escape out of the system. For example, the reaction product obtained through the esterification reaction or the transesterification reaction before the polycondensation reaction may be allowed to stand at a reduced pressure of about 400 to 1 mmHg or about 200 to 3 mmHg for 0.2 to 3 hours, thereby effectively removing the unreacted materials such as the isosorbide, etc., remaining in the polyester resin. Here, the temperature of the product may be controlled to be equal to that of the esterification reaction or the transesterification reaction or that of the polycondensation reaction or a temperature therebetween.

The polymer after the polycondensation reaction preferably has the intrinsic viscosity of 0.30 to 1.0 dl/g. When the intrinsic viscosity is less than 0.30 dl/g, a reaction rate in the solid-phase reaction is significantly lowered. When the intrinsic viscosity is more than 1.0 dl/g, a possibility of polymer discoloration is increased by shear stress between an agitator and the reactor as a viscosity of a molten material during melt polymerization is increased, and side reaction materials such as acetaldehyde are increased.

As described above, the polyester resin according to an exemplary embodiment may be manufactured through steps (a) and (b). In addition, if necessary, the solid-phase reaction may be further performed after the polycondensation reaction to provide a polyester resin having a higher degree of polymerization.

Specifically, (b) the polymer obtained through the polycondensation reaction is discharged out of the reactor to perform granulation. A method of performing the granulation may be a strand cutting method in which the polymer is extruded into a strand shape, solidified in a cooling liquid, and cut with a cutter, or an underwater cutting method in which a die hole is immersed in a cooling liquid, the polymer is directly extruded into the cooling liquid and cut with a cutter. Generally, in the strand cutting method, it is required that the strand is well solidified by maintaining a temperature of the cooling liquid to be low so as not to cause a problem in cutting. In the underwater cutting method, it is preferred to maintain the temperature of the cooling liquid to meet the polymer so that the shape of the polymer is uniform. However, in the case of a crystalline polymer, the temperature of the cooling liquid may be intentionally maintained to be high, thereby inducing crystallization during the discharge.

Meanwhile, by additionally water-washing the granulated polymer, it is possible to provide a polyester resin that satisfies the above-described specific peak area ratio even if the initial content at which (i) the dicarboxylic acid or the derivative thereof and (ii) the diol are added is not adjusted before (a) the esterification reaction or the transesterification reaction. A temperature of water during the water-washing is preferably equal to the glass transition temperature of the polymer or lower than that by about 5 to 20° C., and when the temperature of water is higher than the above-described range, it is not preferred since fusion may occur. In the case of the particles of the polymer in which the crystallization is induced during the discharge, the fusion may not occur even at a temperature higher than the glass transition temperature, and the water temperature may be determined according to a degree of crystallization. By water-washing the granulated polymer, it is possible to remove the raw materials that are dissolved in water among the unreacted raw materials such as the isosorbide, etc. It is advantageous that a particle size is small since as the smaller the particle size, the wider the surface area relative to a weight of particles. In order to achieve the purpose, the particles may be made to have an average weight of about 15 mg or less. For example, the granulated polymer may be water-washed by allowing the polymer stand in water at a temperature equal to the glass transition temperature of the polymer or lower than that by about 5 to 20° C. for 5 minutes to 10 hours.

The granulated polymer is subjected to the crystallization step to prevent fusion during the solid-phase reaction. The crystallization step may proceed in an atmosphere, inert gas, water vapor, water vapor-containing inert gas atmosphere or in solution, and may be performed at 110 to 210° C. or 120 to 210° C. When the temperature is low, a rate at which crystals of the particles are formed is excessively slow.

When the temperature is high, a rate at which a surface of the particles is melted faster than a rate at which the crystals are formed, and the particles adhere to each other to cause fusion. Since the heat resistance of the particles is increased as the particles are crystallized, it is also possible to crystallize the particles by dividing the crystallization into several steps and raising the temperature stepwise.

The solid-phase reaction may be performed under an inert gas atmosphere such as nitrogen, carbon dioxide, argon, etc., or at a reduced pressure of 400 to 0.01 mmHg and at a temperature of 180 to 220° C. DeletedTexts for an average residence time of 1 to 150 hours. By performing the solid-phase reaction, the molecular weight may be additionally increased, and the raw materials that are not reacted in the melting reaction but remain, and a cyclic oligomer, acetaldehyde, etc., that are generated during the reaction may be removed.

Here, when the crystallized polymer is subjected to solid-phase polymerization to have a predetermined level or more of intrinsic viscosity value, it is possible to provide a polyester resin satisfying the above-described specific peak area ratio even if the initial content at which (i) the dicarboxylic acid or the derivative thereof and (ii) the diol are added is adjusted or the water-washing process is omitted. Specifically, it is possible to provide a polyester resin satisfying the above-described specific peak area ratio by performing the solid-phase polymerization on the polymer crystallized by being dissolved in ortho-chlorophenol at a concentration of 1.2 g/dl at 150° C. for 15 minutes so that an intrinsic viscosity measured at 35° C. reaches 0.80 dl/g or more, preferably 0.85 dl/g or more, and more preferably 0.90 dl/g or more.

Further, if (c) the crystallization reaction and (d) the solid-phase reaction are not performed after (b) the polycondensation reaction, the product obtained after (a) the esterification reaction or the transesterification reaction may be polycondensated by being dissolved in ortho-chlorophenol at a concentration of 1.2 g/dl at 150° C. for 15 minutes so that an intrinsic viscosity measured at 35° C. reaches 0.80 dl/g or more, thereby providing a polyester resin satisfying the above-described specific peak area ratio.

The polyester resin manufactured according to the above-described method has a structure in which an acid moiety derived from the dicarboxylic acid or the derivative thereof and a diol moiety derived from the diol are repeated. As used herein, the acid moiety and the diol moiety refer to a residue obtained by polymerizing a dicarboxylic acid or a derivative thereof and a diol and removing hydrogen, a hydroxyl group, or an alkoxy group therefrom.

In particular, the polyester resin may be manufactured according to the above-described method, wherein the diol moiety derived from the isosorbide has a content of 0.5 to 20 mol %, 1 to 20 mol % or 2 to 20 mol % with respect to a total diol moiety derived from the diol, and may satisfy the ratio range of the above-described peak area.

Most of the polyester resin has the structure in which the acid moiety derived from the dicarboxylic acid or the derivative thereof and the diol moiety derived from the diol are repeated, but due to a side reaction, may include a structure in which the diol reacts with other diols to connect the diol moieties derived from the diol each other. However, according to the above-described method, the side reaction may be remarkably reduced. For example, the polyester resin may include a residue derived from a diethylene glycol at a content of about 6 mol % or less or about 4 mol % or less with respect to the total diol derived from the diol in the polyester resin. The polyester resin may exhibit a sufficient glass transition temperature by including the residue derived from the diethylene glycol within the above-described range. Since the polyester resin may not include the residue derived from the diethylene glycol, the lower limit of the content of the residue derived from the diethylene glycol is 0 mol %.

The polyester resin may have a number average molecular weight of about 15,000 to 50,000 g/mol or about 20,000 to 40,000 g/mol. When the molecular weight is less than the above-described range, mechanical properties may be deteriorated, and the polyester resin may not be sufficiently stretched when it is developed for bottles, sheets, multilayer sheets, stretched films or fibers, and thus, it is difficult to secure the desired mechanical properties. On the other hand, when the molecular weight is more than the above-described range, a problem in that molding processability is deteriorated may occur.

Due to the high degree of polymerization, the polyester resin may have an intrinsic viscosity of about 0.7 to 1.4 dl/g or about 0.8 to 1.2 dl/g as measured at 35° C. after being dissolved in ortho-chlorophenol at a concentration of 1.2 g/dl. When the intrinsic viscosity is low, it may be difficult to obtain desired mechanical properties due to insufficient stretching ratio when it is developed for bottles, sheets, multilayer sheets, stretched films or fibers. On the other hand, when the intrinsic viscosity is high, productivity may be decreased during molding, and there is a high possibility of forming a gel. The polyester resin has an appropriate intrinsic viscosity to thereby be easily molded, and may be developed for various applications.

The polyester resin may have a glass transition temperature (Tg) of about 80 to 105° C. or about 81 to 100° C. Within the above-described range, general physical properties of the polyester resin may be exhibited well without yellowing.

The polyester resin may or may not have a crystallization temperature (Tc) and a melting point (Tm) depending on the glass transition temperature (Tg) and DSC measurement conditions. The polyester resin of which the glass transition temperature (Tg) has a range of 80° C. to 85° C. may have a crystallization temperature (Tc) of 120 to 190° C. or 130 to 190° C. In the polyester resin of which the glass transition temperature (Tg) has a range of 85° C. to 105° C., the crystallization temperature (Tc) may not be measured, or may be 130 to 190° C. or 140 to 180° C. Within the above-described range, the polyester resin may have an appropriate crystallization rate to perform the solid-phase polymerization, thereby exhibiting high transparency after molding.

The polyester resin of which the glass transition temperature (Tg) has a range of 80° C. to 85° C. may have a melting point (Tm) of about 210 to 260° C. or about 220 to 250° C. In the polyester resin of which the glass transition temperature (Tg) has a range of 85° C. to 105° C., the melting point (Tm) may not be measured, or may be 200 to 250° C. or 190 to 240° C. Within the above-described range, the polyester resin may have appropriate crystallinity to exhibit good heat resistance and mechanical properties, and may be processed at an appropriate temperature, and thus, the yellowing may not occur.

Further, the polyester resin may have a very small amount of the remaining isosorbide. The isosorbide is observed as a peak having an area proportional to the content in the specific retention time (residence time) range through a gas chromatography. Accordingly, when the polyester resin is analyzed by the gas chromatography, a peak having a very narrow area may be observed at the specific retention time (residence time). Specifically, when a standard solution in which isosorbide is dissolved in chloroform at a concentration of 150 µg/mL, and a resin solution obtained by dissolving a component extracted from 0.5 g of the polyester resin in 5 mL of chloroform using a solvent in which cyclohexane and isopropyl alcohol are mixed at a volume ratio of 2.5:97.5, are analyzed by gas chromatography, respectively, the content of the isosorbide remaining in the polyester resin may be determined through the peak area ratio of the peak of the resin solution confirmed at the same retention time to the peak confirmed in the analysis of the standard solution. For example, in the polyester resin, the peak area ratio of the resin solution to the peak area of the standard solution may be 1.0 or less, 0.80 or less, 0.60 or less, 0.40 or less, or 0.35 or less. Within the above-described range, a low content of the isosorbide remaining in the polyester resin may be assured.

Since the polyester resin has a small residual content of isosorbide, deterioration of physical properties during thermoforming hardly occurs, and thus, a high-quality polymer product may be provided.

For example, a color b value of a specimen having a size of 30 mm×30 mm×3 mm (width×length×thickness) obtained by injection molding the polyester resin at 290° C. may be −2.0 to 3.0, −1.5 to 2.0, −1.2 to 1.5 or −1.0 to 0.5 as measured by a color difference meter.

As described above, the polyester resin according to the exemplary embodiment has a very low content of the remaining isosorbide, and thus, deterioration of physical properties such as yellowing, etc., during processing is little. Accordingly, the polyester resin may be utilized in various fields, and in particular, it is expected that the polyester resin is useful for injection-molded articles, bottles, sheets, multilayer sheets, stretched films and fiber applications due to excellent heat resistance and transparency.

Hereinafter, action and effects of the present invention are described by specific Examples of the present invention in more detail. Meanwhile, these Examples are provided by way of example, and therefore, should not be construed as limiting the scope of the present invention.

The following physical properties were evaluated or the following analyzes were performed according to the following methods.

(1) Intrinsic viscosity (IV): 0.36±0.0002 g of a sample was dissolved in 30 mL of ortho-chlorophenol at 150° C. for 15 minutes, and the intrinsic viscosity of the sample was measured using a Ubbelodhe viscometer in a thermostatic chamber at 35° C.

(2) Compositions of residues derived from an acid and a diol in the polyester resin were confirmed by $^1$H-NMR spectrum obtained at 25° C. using a nuclear magnetic resonance apparatus (JEOL, 600 MHz FT-NMR) after the sample was dissolved in a $CDCl_3$ solvent at a concentration of 3 mg/mL.

(3) Heat resistance: about 6 to 10 mg of a polyester resin was filled in an aluminum pan, and the polyester resin was heated from room temperature up to 280° C. at a rate of 10° C./min (primary scan) and annealed at 280° C. for 3 minutes by using a differential scanning calorimeter (METTLER TOLEDO, DSC 1). Then, the polyester resin was rapidly cooled to room temperature, and then heated again from room temperature up to 280° C. at a rate of 10° C./min (secondary scan) to obtain a DSC curve.

When the polymer causes glass transition, the specific heat of the amorphous material is increased, and the DSC curve shows a characteristic shift toward an endothermic direction. Accordingly, a temperature at which the maximum slope of the curve appears at a point where the DSC curve is changed to be stepwise for the first time during the heating process was defined as a glass transition temperature (Tg) of the polyester resin, and a temperature of the peak of the endothermic curve obtained in the heating process was defined as a melting temperature (Tm) of the polyester resin. Tg). (4) Color of chip: colors of particles produced as results of the polycondensation reaction in Examples and Comparative Examples or as results of the solid-phase polymerization reaction were shown as Hunter Lab color space values designed by R. S. Hunter in 1948. 26 g of a sample was filled into a cell (KONICA MINOLTA, CM-A99), and then, a color coordinate value was measured using a color difference meter (KONICA MINOLTA, CM-3600A). The measurement was repeated three times, and the color coordinate value was determined by averaging three color coordinate values obtained by repeating the measurement three times. In the color coordinate values, the color L value means brightness. As the L value is larger, it means that the color is closer to white. Specifically, when L is 0, it is black, and when L is 100, it is white. The color a represents green and red, and it means that it is closer to green when the value thereof is negative, and that it is closer to red when the value thereof is positive. Similarly, the color b represents blue and yellow, and it means that it is closer to blue when the value thereof is negative, and that it is closer to yellow when the value thereof is positive.

(5) Color of injection molded specimen: a polyester resin was placed in a dehumidifying drier (MORETTO, Mini Dryer X DRY AIR T) and stored at 80° C. for 24 hours to dry the polyester resin so that a water content in the polyester resin was 300 ppm or less. Here, the water content in the polyester resin was measured at 230° C. via a Karl Fischer Moisture Meter (Mitsubishi, VA-100), and the quantitative limit (LOQ) was 0.01%. With respect to the content or lower than that, the data relative standard deviation (RSD) was 10% or more, and the quantitative reliability was low.

Then, the dried polyester resin was put into a molding machine (BOY, 12M) set at a screw temperature of 290° C., and a mold temperature of 20° C. to form a specimen having a size of 30 mm×30 mm×3 mm (width×length×thickness).

The color of the specimen injection molded as described above was shown as the Hunter Lab color space value designed by R. S. Hunter in 1948. Specifically, the color coordinate value of the prepared specimen was measured using a color difference meter (KONICA MINOLTA, CM-3600A). The measurement was repeated three times, and the color coordinate value was determined by averaging three color coordinate values obtained by repeating the measurement three times.

(6) Measurement of area ratio of remaining isosorbide (ISB) (remaining ISB content)

<Preparation of Standard Solution>

1.5 g of isosorbide was added to 100 mL of chloroform, and dissolved by stirring for 1 hour. The dissolved solution was diluted to prepare a standard solution at a concentration of 150 µg/mL.

<Sample Pretreatment>

30 to 40 g of the polyester resin to be analyzed was frozen and pulverized. 0.5 g of the frozen and pulverized sample was weighed and put into an ASE cell. A component containing isosorbide remaining in the sample was extracted from the sample under ASE process conditions described below. The solution extracted through the ASE process was distilled under reduced pressure at room temperature to remove the solvent. Further, the obtained solute was dissolved in 5 mL of chloroform and filtered through a filter of 0.45 μm size to remove insoluble materials, thereby obtaining a pretreated sample.

<ASE Process Conditions>

Dionex (ASE 200) model was used for an Accelerated Solvent Extraction (ASE) process. A component containing isosorbide remaining in the sample was extracted from 0.5 g of the frozen and pulverized sample using a solvent in which cyclohexane and isopropyl alcohol were mixed at a volume ratio of 2.5:97.5. In this process, an oven temperature was adjusted to 150° C., and an oven pressure was adjusted to 1500 psi. As the gas, nitrogen was used. A preheating time, a heating time, and an extraction time were set to 1 minute, 7 minutes, and 10 minutes, respectively.

<Measurement>

Agilent 7890B (GC-FID) was used for gas chromatography, and DB-5MS (60 m*0.32 μm*1.0 μm) model was used for a column. After the oven was stabilized at 40° C. for 5 minutes, the temperature was raised up to 100° C. at a rate of 10° C./min, maintained at 100° C. for 5 minutes, raised up to 210° C. at a rate of 30° C./min, raised up to 260° C. at a rate of 5° C./min, raised up to 320° C. at a rate of 60° C./min, and maintained at 320° C. for 10 minutes. A temperature of an injector was 280° C., a temperature of a detector was 320° C., the flow was 1 mL/min, the split was ¹⁄₁₀, the injection volume was 1 μL, and the carrier gas was nitrogen. This process was repeated three times for the same sample.

<Analysis>

As a result of analysis of the isosorbide standard solution, the isosorbide was observed as a peak at a retention time (RT) of 20.1 minutes. Then, for comparison with the analysis result of the polyester resin sample, an area of a peak obtained as a result of analysis of the standard solution was obtained. Then, the pretreated polyester resin sample was analyzed by the above-mentioned method, and the peak area at the RT at which the isosorbide was confirmed in the analysis of the standard solution was determined. The content of the isosorbide remaining in the polyester resin was introduced into the following Equation obtained by dividing the average peak area determined by three times repeated measurements on the same sample by the peak area of the standard solution, that is, (average peak area of the polyester resin sample)/(peak area of the standard solution), and results thereof were shown in Table 1 below.

(7) Number average molecular weight: 0.3 g of a sample was dissolved in 15 mL of ortho-chlorophenol at 150° C. for 15 minutes, and then, 9 mL of chloroform was added thereto at room temperature. The GPC system was manufactured from Tosoh company, and a molecular weight of the sample was measured using an RI detector.

Example 1: Manufacture of Polyester Resin 3277.4 g (19.7 mol) of terephthalic acid, 1246.1 g (20.1 mol) of ethylene glycol, and 63.4 g (0.4 mol) of isosorbide were put into a 10 L volumetric reactor to which a column, and a condenser capable of being cooled by water were connected (a molar ratio of the dicarboxylic acid or the derivative thereof to the diol was 1:1.04).

1.0 g of $GeO_2$ was used as a catalyst, 1.46 g of phosphoric acid was used as a stabilizer, and 0.7 g of cobalt acetate was used as a coloring agent.

Then, nitrogen was injected into the reactor to form a pressurized state in which a pressure of the reactor was higher than normal pressure by 1.0 kgf/cm² (absolute pressure: 1495.6 mmHg).

In addition, a temperature of the reactor was raised from room temperature up to 220° C. over 90 minutes, maintained at 220° C. for 2 hours, and then raised up to 260° C. over 2 hours. Next, a temperature of the reactor was maintained at 260° C. until the mixture in the reactor became transparent by visually observing the mixture. In this process, 650 g of byproducts were spilled through the column and the condenser. When an esterification reaction was completed, nitrogen in the reactor in the pressurized state was purged to the outside, thereby lowering the pressure in the reactor to normal pressure. Then, the mixture in the reactor was transferred to a 7 L volumetric reactor in which a vacuum reaction was capable of being performed.

Then, the pressure of the reactor was lowered from normal pressure up to 5 Torr (absolute pressure: 5 mmHg) over 30 minutes, and at the same time, the temperature of the reactor was raised up to 280° C. over 1 hour, and the pressure of the reactor was maintained to 1 Torr (absolute pressure: 1 mmHg) or less, such that a polycondensation reaction was performed. In the early stage of the polycondensation reaction, a stirring speed was set at a high speed. However, when as the polycondensation reaction proceeds, stirring force is weakened due to an increase in viscosity of the reaction product, or a temperature of the reaction product is raised to the set temperature or higher, the stirring speed may be appropriately adjusted. The polycondensation reaction was performed until the intrinsic viscosity (IV) of the mixture (molten material) in the reactor reached 0.60 dl/g. When the intrinsic viscosity of the mixture in the reactor reached a desired level, the mixture was discharged out of the reactor and stranded. The mixture was solidified with a cooling liquid and granulated to have an average weight of about 12 to 14 mg.

The particles were allowed to stand at 140° C. for 1 hour to crystallize, and then put into a 20 L volumetric solid-phase polymerization reactor. Then, nitrogen was flowed into the reactor at a rate of 50 L/min. At this time, the temperature of the reactor was raised from room temperature up to 140° C. at a rate of 40° C./hour, maintained at 140° C. for 3 hours, and then raised up to 200° C. at a rate of 40° C./hour, and maintained at 200° C. The solid-phase polymerization reaction was performed until the intrinsic viscosity (IV) of the particles in the reactor reached 0.90 dl/g.

A residue derived from the terephthalic acid was 100 mol % with respect to a residue derived from a total acid included in the thus-manufactured polyester resin, and a residue derived from the isosorbide was 2 mol %, and a residue derived from ethylene glycol was 95 mol %, and a residue derived from diethylene glycol was 3 mol % with respect to a residue derived from a total diol.

The peak area ratio of the polyester resin solution to the isosorbide standard solution analyzed by gas chromatography (GC) was 0.13.

Example 2: Manufacture of Polyester Resin 3277.4 g (19.7 mol) of terephthalic acid, 1218.0 g (19.6 mol) of ethylene glycol, and 72.1 g (0.5 mol) of isosorbide were put into a 10 L volumetric reactor to which a column, and a condenser capable of being cooled by water were connected (a molar ratio of the dicarboxylic acid or the derivative thereof to the diol was 1:1.02).

1.0 g of $GeO_2$ was used as a catalyst, 1.46 g of phosphoric acid was used as a stabilizer, and 0.7 g of cobalt acetate was used as a coloring agent.

Then, nitrogen was injected into the reactor to form a pressurized state in which a pressure of the reactor was higher than normal pressure by 1.0 kgf/cm² (absolute pressure: 1495.6 mmHg).

In addition, a temperature of the reactor was raised from room temperature up to 220° C. over 90 minutes, maintained at 220° C. for 2 hours, and then raised up to 260° C. over 2 hours. Then, the temperature of the reactor was maintained at 260° C. In this process, it was confirmed that 500 g of byproducts were spilled through the column and the condenser, and then 12.3 g (0.20 mol) of ethylene glycol was further added to the reactor. A temperature of the reactor was maintained at 260° C. until the mixture in the reactor became transparent by visually observing the mixture. When an esterification reaction was completed, nitrogen in the reactor in the pressurized state was purged to the outside, thereby lowering the pressure in the reactor to normal pressure. Then, the mixture in the reactor was transferred to a 7 L volumetric reactor in which a vacuum reaction was capable of being performed.

Then, the pressure of the reactor was lowered from normal pressure up to 5 Torr (absolute pressure: 5 mmHg) over 30 minutes, and at the same time, the temperature of the reactor was raised up to 280° C. over 1 hour, and the pressure of the reactor was maintained to 1 Torr (absolute pressure: 1 mmHg) or less, such that a polycondensation reaction was performed. A polyester resin was manufactured in the same manner as in Example 1 except that the polycondensation reaction was performed until the intrinsic viscosity (IV) of the mixture in the reactor reached 0.48 dl/g, and the solid-phase polymerization reaction was performed until the intrinsic viscosity (IV) of the particles in the reactor reached 0.80 dl/g.

A residue derived from the terephthalic acid was 100 mol % with respect to a residue derived from a total acid included in the thus-manufactured polyester resin, and a residue derived from the isosorbide was 2 mol %, and a residue derived from ethylene glycol was 95 mol %, and a residue derived from diethylene glycol was 3 mol % with respect to a residue derived from a total diol.

The peak area ratio of the polyester resin solution to the isosorbide standard solution analyzed by gas chromatography (GC) was 0.13.

Example 3: Manufacture of Polyester Resin 3455.5 g (20.8 mol) of terephthalic acid, 1251.9 g (20.2 mol) of ethylene glycol, and 212.7 g (1.5 mol) of isosorbide were put into a 10 L volumetric reactor to which a column, and a condenser capable of being cooled by water were connected (a molar ratio of the dicarboxylic acid or the derivative thereof to the diol was 1:1.04).

1.0 g of GeO₂ was used as a catalyst, 1.56 g of phosphoric acid was used as a stabilizer, 0.012 g of Polysynthren Blue RLS of Clarient Corp. was used as a blue toner, 0.004 g of Solvaperm Red BB of Clarient Corp. was used as a red toner, and 100 ppm of trimellitic anhydrate was used as a branching agent.

Then, nitrogen was injected into the reactor to form a pressurized state in which a pressure of the reactor was higher than normal pressure by 1.0 kgf/cm² (absolute pressure: 1495.6 mmHg).

In addition, a temperature of the reactor was raised from room temperature up to 220° C. over 90 minutes, maintained at 220° C. for 2 hours, and then raised up to 255° C. over 2 hours. Next, a temperature of the reactor was maintained at 255° C. until the mixture in the reactor became transparent by visually observing the mixture. When an esterification reaction was completed, nitrogen in the reactor in the pressurized state was purged to the outside, thereby reducing the pressure in the reactor to normal pressure. Then, the mixture in the reactor was transferred to a 7 L volumetric reactor in which a vacuum reaction was capable of being performed.

Then, the pressure of the reactor was lowered from normal pressure up to 5 Torr (absolute pressure: 5 mmHg) over 30 minutes, and at the same time, the temperature of the reactor was raised up to 280° C. over 1 hour, and the pressure of the reactor was maintained to 1 Torr (absolute pressure: 1 mmHg) or less, such that a polycondensation reaction was performed. In the early stage of the polycondensation reaction, a stirring speed was set at a high speed. However, due to the polycondensation reaction, when stirring force is weakened, or a temperature of the mixed product is raised to the set temperature or higher, the stirring speed may be appropriately adjusted. The polycondensation reaction was performed until the intrinsic viscosity (IV) of the mixture (molten material) in the reactor reached 0.52 dl/g. When the intrinsic viscosity of the mixture in the reactor reached a desired level, the mixture was discharged out of the reactor and stranded. The mixture was solidified with a cooling liquid and granulated to have an average weight of about 12 to 14 mg.

The particles were allowed to stand at 160° C. for 1 hour to crystallize, and then put into a 20 L volumetric solid-phase polymerization reactor. Then, nitrogen was flowed into the reactor at a rate of 50 L/min. At this time, the temperature of the reactor was raised from room temperature up to 140° C. at a rate of 40° C./hour, maintained at 140° C. for 3 hours, and then raised up to 200° C. at a rate of 40° C./hour, and maintained at 200° C. The solid-phase polymerization reaction was performed until the intrinsic viscosity (IV) of the particles in the reactor reached 0.9 dl/g.

A residue derived from the terephthalic acid was 100 mol % with respect to a residue derived from a total acid included in the thus-manufactured polyester resin, and a residue derived from the isosorbide was 6 mol %, and a residue derived from ethylene glycol was 92 mol %, and a residue derived from diethylene glycol was 2 mol % with respect to a residue derived from a total diol.

The peak area ratio of the polyester resin solution to the isosorbide standard solution analyzed by gas chromatography (GC) was 0.20.

Example 4: Manufacture of Polyester Resin 3455.5 g (20.8 mol) of terephthalic acid, 1677.8 g (27.1 mol) of ethylene glycol, and 303.9 g (2.1 mol) of isosorbide were put into a 10 L volumetric reactor to which a column, and a condenser capable of being cooled by water were connected (a molar ratio of the dicarboxylic acid or the derivative thereof to the diol was 1:1.40).

1.0 g of GeO₂ was used as a catalyst, 1.56 g of phosphoric acid was used as a stabilizer, 0.016 g of Polysynthren Blue RLS of Clarient Corp. was used as a blue toner, and 0.004 g of Solvaperm Red BB of Clarient Corp. was used as a red toner.

Then, nitrogen was injected into the reactor to form a pressurized state in which a pressure of the reactor was higher than normal pressure by 1.0 kgf/cm² (absolute pressure: 1495.6 mmHg).

In addition, a temperature of the reactor was raised from room temperature up to 220° C. over 90 minutes, maintained at 220° C. for 2 hours, and then raised up to 255° C. over 2 hours. Next, a temperature of the reactor was maintained at 255° C. until the mixture in the reactor became transparent by visually observing the mixture. When an esterification reaction was completed, nitrogen in the reactor in the pressurized state was purged to the outside, thereby reducing the pressure in the reactor to normal pressure. Then, the mixture in the reactor was transferred to a 7 L volumetric reactor in which a vacuum reaction was capable of being performed.

Then, the pressure of the reactor was lowered from normal pressure up to 5 Torr (absolute pressure: 5 mmHg) over 30 minutes, and at the same time, the temperature of the reactor was raised up to 280° C. over 1 hour, and the pressure of the reactor was maintained to 1 Torr (absolute pressure: 1 mmHg) or less, such that a polycondensation reaction was performed. In the early stage of the polycondensation reaction, a stirring speed was set at a high speed. However, due to the polycondensation reaction, when stirring force is weakened, or a temperature of the mixed product is raised to the set temperature or higher, the stirring speed may be appropriately adjusted. The polycondensation reaction was performed until the intrinsic viscosity (IV) of the mixture (molten material) in the reactor reached 0.60 dl/g. When the intrinsic viscosity of the mixture in the reactor reached a desired level, the mixture was discharged out of the reactor and stranded. The mixture was solidified with a cooling liquid and granulated to have an average weight of about 12 to 14 mg. The thus-obtained particles were stored in water at 70° C. for 5 hours to remove unreacted raw materials contained in the particles.

Then, a polyester resin was manufactured in the same manner as in Example 3 using the above-described particles.

A residue derived from the terephthalic acid was 100 mol % with respect to a residue derived from a total acid included in the thus-manufactured polyester resin, and a residue derived from the isosorbide was 6 mol %, and a residue derived from ethylene glycol was 92 mol %, and a residue derived from diethylene glycol was 2 mol % with respect to a residue derived from a total diol.

The peak area ratio of the polyester resin solution to the isosorbide standard solution analyzed by gas chromatography (GC) was 0.20.

Example 5: Manufacture of Polyester Resin 3302.5 g (19.9 mol) of terephthalic acid, 1319.8 g (21.3 mol) of ethylene glycol, and 377.6 g (2.6 mol) of isosorbide were put into a 10 L volumetric reactor to which a column, and a condenser capable of being cooled by water were connected (a molar ratio of the dicarboxylic acid or the derivative thereof to the diol was 1:1.20).

1.0 g of $GeO_2$ was used as a catalyst, 1.52 g of phosphoric acid was used as a stabilizer, 0.02 g of Polysynthren Blue RLS of Clarient Corp. was used as a blue toner, and 0.004 g of Solvaperm Red BB of Clarient Corp. was used as a red toner.

Then, nitrogen was injected into the reactor to form a pressurized state in which a pressure of the reactor was higher than normal pressure by 0.5 $kgf/cm^2$ (absolute pressure: 1127.8 mmHg).

In addition, a temperature of the reactor was raised from room temperature up to 220° C. over 90 minutes, maintained at 220° C. for 2 hours, and then raised up to 250° C. over 2 hours. Next, a temperature of the reactor was maintained at 250° C. until the mixture in the reactor became transparent by visually observing the mixture. When an esterification reaction was completed, nitrogen in the reactor in the pressurized state was purged to the outside, thereby reducing the pressure in the reactor to normal pressure. Then, the mixture in the reactor was transferred to a 7 L volumetric reactor in which a vacuum reaction was capable of being performed.

Then, the pressure of the reactor was lowered from normal pressure up to 5 Torr (absolute pressure: 5 mmHg) over 30 minutes, and at the same time, the temperature of the reactor was raised up to 280° C. over 1 hour, and the pressure of the reactor was maintained to 1 Torr (absolute pressure: 1 mmHg) or less, such that a polycondensation reaction was performed. In the early stage of the polycondensation reaction, a stirring speed was set at a high speed. However, due to the polycondensation reaction, when stirring force is weakened, or a temperature of the mixed product is raised to the set temperature or higher, the stirring speed may be appropriately adjusted. The polycondensation reaction was performed until the intrinsic viscosity (IV) of the mixture (molten material) in the reactor reached 0.45 dl/g. When the intrinsic viscosity of the mixture in the reactor reached a desired level, the mixture was discharged out of the reactor and stranded. The mixture was solidified with a cooling liquid and granulated to have an average weight of about 12 to 14 mg.

The particles were allowed to stand at 160° C. for 1 hour to crystallize, and then put into a 20 L volumetric solid-phase polymerization reactor. Then, nitrogen was flowed into the reactor at a rate of 50 L/min. At this time, the temperature of the reactor was raised from room temperature up to 140° C. at a rate of 40° C./hour, maintained at 140° C. for 3 hours, and then raised up to 200° C. at a rate of 40° C./hour, and maintained at 200° C. The solid-phase polymerization was performed until the intrinsic viscosity (IV) of the particles in the reactor reached 1.00 dl/g.

A residue derived from the terephthalic acid was 100 mol % with respect to a residue derived from a total acid included in the thus-manufactured polyester resin, and a residue derived from the isosorbide was 10 mol %, and a residue derived from ethylene glycol was 88.5 mol %, and a residue derived from diethylene glycol was 1.5 mol % with respect to a residue derived from a total diol.

The peak area ratio of the polyester resin solution to the isosorbide standard solution analyzed by gas chromatography (GC) was 0.27.

Example 6: Manufacture of Polyester Resin 3234.2 g (19.5 mol) of terephthalic acid, 1377.1 g (22.2 mol) of ethylene glycol, and 455.1 g (3.1 mol) of isosorbide were put into a 10 L volumetric reactor to which a column, and a condenser capable of being cooled by water were connected (a molar ratio of the dicarboxylic acid or the derivative thereof to the diol was 1:1.30).

1.0 g of $GeO_2$ was used as a catalyst, 1.5 g of phosphoric acid was used as a stabilizer, 0.020 g of Polysynthren Blue RLS of Clarient Corp. was used as a blue toner, 0.004 g of Solvaperm Red BB of Clarient Corp. was used as a red toner, and 100 ppm of Iganox 1076 was used as an antioxidant.

Then, nitrogen was injected into the reactor to form a pressurized state in which a pressure of the reactor was higher than normal pressure by 0.5 $kgf/cm^2$ (absolute pressure: 1127.8 mmHg).

In addition, a temperature of the reactor was raised from room temperature up to 220° C. over 90 minutes, maintained at 220° C. for 2 hours, and then raised up to 260° C. over 2 hours. Next, a temperature of the reactor was maintained at 260° C. until the mixture in the reactor became transparent by visually observing the mixture. When an esterification reaction was completed, nitrogen in the reactor in the pressurized state was purged to the outside, thereby reducing the pressure in the reactor to normal pressure. Then, the mixture in the reactor was transferred to a 7 L volumetric reactor in which a vacuum reaction was capable of being performed.

Then, the pressure of the reactor was lowered from normal pressure up to 100 Torr (absolute pressure: 100 mmHg) over 10 minutes, and the pressure state was maintained for 1 hour. Then, the temperature of the reactor was raised up to 270° C. over 1 hour, and the pressure of the reactor was maintained to 1 Torr (absolute pressure: 1 mmHg) or less, such that a polycondensation reaction was performed.

In the early stage of the polycondensation reaction, a stirring speed was set at a high speed. However, due to the polycondensation reaction, when stirring force is weakened, or a temperature of the mixed product is raised to the set temperature or higher, the stirring speed may be appropriately adjusted. The polycondensation reaction was performed until the intrinsic viscosity (IV) of the mixture (molten material) in the reactor reached 0.55 dl/g. When the intrinsic viscosity of the mixture in the reactor reached a desired level, the mixture was discharged out of the reactor and stranded. The mixture was solidified with a cooling liquid and granulated to have an average weight of about 12 to 14 mg.

The particles were allowed to stand at 160° C. for 1 hour to crystallize, and then put into a 20 L volumetric solid-phase polymerization reactor. Then, nitrogen was flowed into the reactor at a rate of 50 L/min. At this time, the temperature of the reactor was raised from room temperature up to 140° C. at a rate of 40° C./hour, maintained at 140° C. for 3 hours, and then raised up to 200° C. at a rate of 40° C./hour, and maintained at 200° C. The solid-phase polymerization was performed until the intrinsic viscosity (IV) of the particles in the reactor reached 1.10 dl/g.

A residue derived from the terephthalic acid was 100 mol % with respect to a residue derived from a total acid included in the thus-manufactured polyester resin, and a residue derived from the isosorbide was 12 mol %, and a residue derived from ethylene glycol was 86.5 mol %, and a residue derived from diethylene glycol was 1.5 mol % with respect to a residue derived from a total diol.

The peak area ratio of the polyester resin solution to the isosorbide standard solution analyzed by gas chromatography (GC) was 0.40.

Example 7: Manufacture of Polyester Resin 3332.1 g (20.1 mol) of terephthalic acid, 1057.8 g (17.1 mol) of ethylene glycol, and 732.7 g (5.0 mol) of isosorbide were put into a 10 L volumetric reactor to which a column, and a condenser capable of being cooled by water were connected (a molar ratio of the dicarboxylic acid or the derivative thereof to the diol was 1:1.1).

1.5 g of $GeO_2$ was used as a catalyst, 1.6 g of phosphoric acid was used as a stabilizer, 0.5 g of cobalt acetate was used as a coloring agent, 0.029 g of Polysynthren Blue RLS of Clarient Corp. was used as a blue toner, 0.004 g of Solvaperm Red BB of Clarient Corp. was used as a red toner, and 1 ppm of polyethylene was used as a crystallizer.

Then, nitrogen was injected into the reactor to form a pressurized state in which a pressure of the reactor was higher than normal pressure by 0.3 kgf/cm² (absolute pressure: 980.7 mmHg).

In addition, a temperature of the reactor was raised from room temperature up to 220° C. over 90 minutes, maintained at 220° C. for 2 hours, and then raised up to 255° C. over 2 hours. Next, a temperature of the reactor was maintained at 255° C. until the mixture in the reactor became transparent by visually observing the mixture. When an esterification reaction was completed, nitrogen in the reactor in the pressurized state was purged to the outside, thereby reducing the pressure in the reactor to normal pressure. Then, the mixture in the reactor was transferred to a 7 L volumetric reactor in which a vacuum reaction was capable of being performed.

Then, the pressure of the reactor was lowered from normal pressure up to 5 Torr (absolute pressure: 5 mmHg) over 30 minutes, and at the same time, the temperature of the reactor was raised up to 275° C. over 1 hour, and the pressure of the reactor was maintained to 2 Torr (absolute pressure: 2 mmHg), such that a polycondensation reaction was performed. In the early stage of the polycondensation reaction, a stirring speed was set at a high speed. However, due to the polycondensation reaction, when stirring force is weakened, or a temperature of the mixed product is raised to the set temperature or higher, the stirring speed may be appropriately adjusted. The polycondensation reaction was performed until the intrinsic viscosity (IV) of the mixture (molten material) in the reactor reached 0.80 dl/g.

A residue derived from the terephthalic acid was 100 mol % with respect to a residue derived from a total acid included in the thus-manufactured polyester resin, and a residue derived from the isosorbide was 20 mol %, and a residue derived from ethylene glycol was 79 mol %, and a residue derived from diethylene glycol was 1 mol % with respect to a residue derived from a total diol.

The peak area ratio of the polyester resin solution to the isosorbide standard solution analyzed by gas chromatography (GC) was 0.57.

Example 8: Manufacture of Polyester Resin 3824.1 g (19.7 mol) of dimethyl terephthalate, 2236.5 g (36.1 mol) of ethylene glycol, and 633.1 g (4.3 mol) of isosorbide were put into a 10 L volumetric reactor to which a column, and a condenser capable of being cooled by water were connected (a molar ratio of the dicarboxylic acid or the derivative thereof to the diol was 1:2.05).

1.5 g of Mn (II) acetate tetrahydrate and 1.8 g of $Sb_2O_3$ were used as catalysts, 1.1 g of cobalt acetate was used as a coloring agent, and 1 g of phosphoric acid was used as a stabilizer.

Then, nitrogen was injected into the reactor, but the pressure of the reactor was not increased (absolute pressure: 760 mmHg). In addition, a temperature of the reactor was raised from room temperature up to 220° C. over 90 minutes, maintained at 220° C. for 2 hours, and then raised up to 240° C. over 2 hours. Next, a temperature of the reactor was maintained at 240° C. until the mixture in the reactor became transparent by visually observing the mixture. When a transesterification reaction was completed, nitrogen in the reactor in the pressurized state was purged to the outside, thereby reducing the pressure in the reactor to normal pressure. Then, the mixture in the reactor was transferred to a 7 L volumetric reactor in which a vacuum reaction was capable of being performed.

Then, the pressure of the reactor was lowered from normal pressure up to 5 Torr (absolute pressure: 5 mmHg) over 30 minutes, and at the same time, the temperature of the reactor was raised up to 285° C. over 1 hour, and the pressure of the reactor was maintained to less than 1 Torr (absolute pressure: 1 mmHg), such that a polycondensation reaction was performed. In the early stage of the polycondensation reaction, a stirring speed was set at a high speed. However, due to the polycondensation reaction, when stirring force is weakened, or a temperature of the mixed product is raised to the set temperature or higher, the stirring speed may be appropriately adjusted. The polycondensation reaction was performed until the intrinsic viscosity (IV) of the mixture (molten material) in the reactor reached 0.60 dl/g. When the intrinsic viscosity of the mixture in the reactor reached a desired level, the mixture was discharged out of the reactor and stranded. The mixture was solidified with a cooling liquid and granulated to have an average weight of about 12 to 14 mg.

The particles were allowed to stand at 115° C. for 6 hours to crystallize, and then put into a 20 L volumetric solid-phase polymerization reactor. Then, nitrogen was flowed into the reactor at a rate of 50 L/min. At this time, the temperature of the reactor was raised from room temperature up to 140° C. at a rate of 40° C./hour, maintained at 140° C. for 3 hours, and then raised up to 205° C. at a rate of 40° C./hour, and maintained at 205° C. The solid-phase polymerization was performed until the intrinsic viscosity (IV) of the particles in the reactor reached 0.95 dl/g.

A residue derived from the terephthalic acid was 100 mol % with respect to a residue derived from a total acid included in the thus-manufactured polyester resin, and a residue derived from the isosorbide was 6 mol %, and a residue derived from ethylene glycol was 91 mol %, and a residue derived from diethylene glycol was 3 mol % with respect to a residue derived from a total diol.

The peak area ratio of the polyester resin solution to the isosorbide standard solution analyzed by gas chromatography (GC) was 0.33.

Example 9: Manufacture of Polyester Resin 3351.8 g (20.18 mol) of terephthalic acid, 103.7 g (0.62 mol) of isophthalic acid, 1264.8 g (20.4 mol) of ethylene glycol, and 243.1 g (1.7 mol) of isosorbide were put into a 10 L volumetric reactor to which a column, and a condenser capable of being cooled by water were connected (a molar ratio of the dicarboxylic acid or the derivative thereof to the diol was 1:1.06).

1.0 g of $GeO_2$ was used as a catalyst, 1.56 g of phosphoric acid was used as a stabilizer, 0.012 g of Polysynthren Blue RLS of Clarient Corp. was used as a blue toner, and 0.004 g of Solvaperm Red BB of Clarient Corp. was used as a red toner.

Then, nitrogen was injected into the reactor to form a pressurized state in which a pressure of the reactor was higher than normal pressure by 0.3 $kgf/cm^2$ (absolute pressure: 980.7 mmHg).

In addition, a temperature of the reactor was raised from room temperature up to 220° C. over 90 minutes, maintained at 220° C. for 2 hours, and then raised up to 255° C. over 2 hours. Next, a temperature of the reactor was maintained at 255° C. until the mixture in the reactor became transparent by visually observing the mixture. When an esterification reaction was completed, nitrogen in the reactor in the pressurized state was purged to the outside, thereby reducing the pressure in the reactor to normal pressure. Then, the mixture in the reactor was transferred to a 7 L volumetric reactor in which a vacuum reaction was capable of being performed.

Then, the pressure of the reactor was lowered from normal pressure up to 5 Torr (absolute pressure: 5 mmHg) over 30 minutes, and at the same time, the temperature of the reactor was raised up to 280° C. over 1 hour, and the pressure of the reactor was maintained to less than 1 Torr (absolute pressure: 1 mmHg), such that a polycondensation reaction was performed. In the early stage of the polycondensation reaction, a stirring speed was set at a high speed. However, due to the polycondensation reaction, when stirring force is weakened, or a temperature of the mixed product is raised to the set temperature or higher, the stirring speed may be appropriately adjusted. The polycondensation reaction was performed until the intrinsic viscosity (IV) of the mixture (molten material) in the reactor reached 0.54 dl/g. When the intrinsic viscosity of the mixture in the reactor reached a desired level, the mixture was discharged out of the reactor and stranded. The mixture was solidified with a cooling liquid and granulated to have an average weight of about 12 to 14 mg.

The particles were allowed to stand at 140° C. for 1 hour to crystallize, and then put into a 20 L volumetric solid-phase polymerization reactor. Then, nitrogen was flowed into the reactor at a rate of 50 L/min. At this time, the temperature of the reactor was raised from room temperature up to 140° C. at a rate of 40° C./hour, maintained at 140° C. for 3 hours, and then raised up to 200° C. at a rate of 40° C./hour, and maintained at 200° C. The solid-phase polymerization was performed until the intrinsic viscosity (IV) of the particles in the reactor reached 0.9 dl/g.

With respect to a residue derived from a total acid included in the thus-manufactured polyester resin, a residue derived from the terephthalic acid was 97 mol % and a residue derived from the isophthalic acid was 3 mol %, and with respect to a residue derived from a total diol, a residue derived from the isosorbide was 6 mol %, and a residue derived from ethylene glycol was 92 mol %, and a residue derived from diethylene glycol was 2 mol %.

The peak area ratio of the polyester resin solution to the isosorbide standard solution analyzed by gas chromatography (GC) was 0.27.

Example 10: Manufacture of Polyester Resin 3302.5 g (19.9 mol) of terephthalic acid, 1370.6 g (22.1 mol) of ethylene glycol, and 407.1 g (2.8 mol) of isosorbide were put into a 10 L volumetric reactor to which a column, and a condenser capable of being cooled by water were connected (a molar ratio of the dicarboxylic acid or the derivative thereof to the diol was 1:1.25).

1.0 g of $GeO_2$ was used as a catalyst, 1.52 g of phosphoric acid was used as a stabilizer, 0.028 g of Polysynthren Blue RLS of Clarient Corp. was used as a blue toner, and 0.004 g of Solvaperm Red BB of Clarient Corp. was used as a red toner.

Then, nitrogen was injected into the reactor to form a pressurized state in which a pressure of the reactor was higher than normal pressure by 0.3 $kgf/cm^2$ (absolute pressure: 980.7 mmHg).

In addition, a temperature of the reactor was raised from room temperature up to 220° C. over 90 minutes, maintained at 220° C. for 2 hours, and then raised up to 250° C. over 2 hours. Next, a temperature of the reactor was maintained at 250° C. until the mixture in the reactor became transparent by visually observing the mixture. When an esterification reaction was completed, nitrogen in the reactor in the pressurized state was purged to the outside, thereby reducing the pressure in the reactor to normal pressure. Then, the mixture in the reactor was transferred to a 7 L volumetric reactor in which a vacuum reaction was capable of being performed.

Then, the pressure of the reactor was lowered from normal pressure up to 100 Torr (absolute pressure: 100 mmHg) over 10 minutes, and the pressure state was maintained to for 1 hour. Then, the temperature of the reactor was raised up to 280° C. over 1 hour, and the pressure of the reactor was maintained to 1 Torr (absolute pressure: 1 mmHg) or less, such that a polycondensation reaction was performed.

In the early stage of the polycondensation reaction, a stirring speed was set at a high speed. However, due to the polycondensation reaction, when stirring force is weakened, or a temperature of the mixed product is raised to the set temperature or higher, the stirring speed may be appropriately adjusted. The polycondensation reaction was performed until the intrinsic viscosity (IV) of the mixture (molten material) in the reactor reached 0.80 dl/g.

A residue derived from the terephthalic acid was 100 mol % with respect to a residue derived from a total acid included in the thus-manufactured polyester resin, and a residue derived from the isosorbide was 10 mol %, and a residue derived from ethylene glycol was 89 mol %, and a residue derived from diethylene glycol was 1 mol % with respect to a residue derived from a total diol.

The peak area ratio of the polyester resin solution to the isosorbide standard solution analyzed by gas chromatography (GC) was 0.40.

Comparative Example 1: Manufacture of Polyester Resin 3447.9 g (20.8 mol) of terephthalic acid, 1918.8 g (30.9 mol) of ethylene glycol, and 333.6 g (2.3 mol) of isosorbide were put into a 10 L volumetric reactor to which a column, and a condenser capable of being cooled by water were connected (a molar ratio of the dicarboxylic acid or the derivative thereof to the diol was 1:1.60).

1.0 g of $GeO_2$ was used as a catalyst, 1.56 g of phosphoric acid was used as a stabilizer, 0.012 g of Polysynthren Blue RLS of Clarient Corp. was used as a blue toner, and 0.004 g of Solvaperm Red BB of Clarient Corp. was used as a red toner.

Then, nitrogen was injected into the reactor to form a pressurized state in which a pressure of the reactor was higher than normal pressure by 1.0 $kgf/cm^2$ (absolute pressure: 1495.6 mmHg).

In addition, a temperature of the reactor was raised from room temperature up to 220° C. over 90 minutes, maintained at 220° C. for 2 hours, and then raised up to 255° C. over 2 hours. Next, a temperature of the reactor was maintained at 255° C. until the mixture in the reactor became transparent by visually observing the mixture. When an esterification reaction was completed, nitrogen in the reactor in the pressurized state was purged to the outside, thereby reducing the pressure in the reactor to normal pressure. Then, the mixture in the reactor was transferred to a 7 L volumetric reactor in which a vacuum reaction was capable of being performed.

Then, the pressure of the reactor was lowered from normal pressure up to 5 Torr (absolute pressure: 5 mmHg) over 30 minutes, and at the same time, the temperature of the reactor was raised up to 280° C. over 1 hour, and the pressure of the reactor was maintained to less than 1 Torr (absolute pressure: 1 mmHg), such that a polycondensation reaction was performed. In the early stage of the polycondensation reaction, a stirring speed was set at a high speed. However, due to the polycondensation reaction, when stirring force is weakened, or a temperature of the mixed product is raised to the set temperature or higher, the stirring speed may be appropriately adjusted. The polycondensation reaction was performed until the intrinsic viscosity (IV) of the mixture (molten material) in the reactor reached 0.52 dl/g. When the intrinsic viscosity of the mixture in the reactor reached a desired level, the mixture was discharged out of the reactor and stranded. The mixture was solidified with a cooling liquid and granulated to have an average weight of about 12 to 14 mg.

The particles were allowed to stand at 160° C. for 1 hour to crystallize, and then put into a 20 L volumetric solid-phase polymerization reactor. Then, nitrogen was flowed into the reactor at a rate of 50 L/min. At this time, the temperature of the reactor was raised from room temperature up to 140° C. at a rate of 40° C./hour, maintained at 140° C. for 3 hours, and then raised up to 200° C. at a rate of 40° C./hour, and maintained at 200° C. The solid-phase polymerization was performed until the intrinsic viscosity (IV) of the particles in the reactor reached 0.9 dl/g.

A residue derived from the terephthalic acid was 100 mol % with respect to a residue derived from a total acid included in the thus-manufactured polyester resin, and a residue derived from the isosorbide was 6 mol %, and a residue derived from ethylene glycol was 91 mol %, and a residue derived from diethylene glycol was 3 mol % with respect to a residue derived from a total diol.

The peak area ratio of the polyester resin solution to the isosorbide standard solution analyzed by gas chromatography (GC) was 1.07.

Comparative Example 2: Manufacture of Polyester Resin 3302.5 g (19.9 mol) of terephthalic acid, 1319.8 g (21.3 mol) of ethylene glycol, and 377.6 g (2.6 mol) of isosorbide were put into a 10 L volumetric reactor to which a column, and a condenser capable of being cooled by water were connected (a molar ratio of the dicarboxylic acid or the derivative thereof to the diol was 1:1.20).

1.0 g of $GeO_2$ was used as a catalyst, 1.52 g of phosphoric acid was used as a stabilizer, 0.02 g of Polysynthren Blue RLS of Clarient Corp. was used as a blue toner, and 0.004 g of Solvaperm Red BB of Clarient Corp. was used as a red toner.

Then, nitrogen was injected into the reactor to form a pressurized state in which a pressure of the reactor was higher than normal pressure by 0.5 $kgf/cm^2$ (absolute pressure: 1127.8 mmHg).

In addition, a temperature of the reactor was raised from room temperature up to 220° C. over 90 minutes, maintained at 220° C. for 2 hours, and then raised up to 250° C. over 2 hours. Next, a temperature of the reactor was maintained at 250° C. until the mixture in the reactor became transparent by visually observing the mixture. When an esterification reaction was completed, nitrogen in the reactor in the pressurized state was purged to the outside, thereby reducing the pressure in the reactor to normal pressure. Then, the mixture in the reactor was transferred to a 7 L volumetric reactor in which a vacuum reaction was capable of being performed.

Then, the pressure of the reactor was lowered from normal pressure up to 5 Torr (absolute pressure: 5 mmHg) over 30 minutes, and at the same time, the temperature of the reactor was raised up to 280° C. over 1 hour, and the pressure of the reactor was maintained to less than 1 Torr (absolute pressure: 1 mmHg), such that a polycondensation reaction was performed. In the early stage of the polycondensation reaction, a stirring speed was set at a high speed. However, due to the polycondensation reaction, when stirring force is weakened, or a temperature of the mixed product is raised to the set temperature or higher, the stirring speed may be appropriately adjusted. The polycondensation reaction was performed until the intrinsic viscosity (IV) of the mixture (molten material) in the reactor reached 0.45 dl/g. When the intrinsic viscosity of the mixture in the reactor reached a desired level, the mixture was discharged out of the reactor and stranded. The mixture was solidified with a cooling liquid and granulated to have an average weight of about 12 to 14 mg.

The particles were allowed to stand at 160° C. for 1 hour to crystallize, and then put into a 20 L volumetric solid-phase polymerization reactor. Then, nitrogen was flowed into the reactor at a rate of 50 L/min. At this time, the temperature of the reactor was raised from room temperature up to 140° C. at a rate of 40° C./hour, maintained at 140° C. for 3 hours, and then raised up to 200° C. at a rate of 40° C./hour, and maintained at 200° C. The solid-phase polymerization was performed until the intrinsic viscosity (IV) of the particles in the reactor reached 0.75 dl/g.

A residue derived from the terephthalic acid was 100 mol % with respect to a residue derived from a total acid included in the thus-manufactured polyester resin, and a residue derived from the isosorbide was 10 mol %, and a residue derived from ethylene glycol was 88.5 mol %, and a residue derived from diethylene glycol was 1.5 mol % with respect to a residue derived from a total diol.

The peak area ratio of the polyester resin solution to the isosorbide standard solution analyzed by gas chromatography (GC) was 1.07.

Comparative Example 3: Manufacture of Polyester Resin 3254.6 g (19.6 mol) of terephthalic acid, 1385.7 g (22.4 mol) of ethylene glycol, and 458.0 g (3.1 mol) of isosorbide were put into a 10 L volumetric reactor to which a column, and a condenser capable of being cooled by water were connected (a molar ratio of the dicarboxylic acid or the derivative thereof to the diol was 1:30).

1.0 g of $GeO_2$ was used as a catalyst, 1.52 g of phosphoric acid was used as a stabilizer, 0.020 g of Polysynthren Blue RLS of Clarient Corp. was used as a blue toner, 0.004 g of Solvaperm Red BB of Clarient Corp. was used as a red toner, and 100 ppm of Iganox 1076 was used as an antioxidant.

Then, nitrogen was injected into the reactor to form a pressurized state in which a pressure of the reactor was higher than normal pressure by 0.5 kgf/cm$^2$ (absolute pressure: 1127.8 mmHg).

In addition, a temperature of the reactor was raised from room temperature up to 220° C. over 90 minutes, maintained at 220° C. for 2 hours, and then raised up to 260° C. over 2 hours. Next, the mixture in the reactor was visually observed, and a temperature of the reactor was maintained at 260° C. until the mixture became transparent. When an esterification reaction was completed, nitrogen in the reactor in the pressurized state was purged to the outside, thereby reducing the pressure in the reactor to normal pressure. Then, the mixture in the reactor was transferred to a 7 L volumetric reactor in which a vacuum reaction was capable of being performed.

Then, the pressure of the reactor was lowered from normal pressure up to 5 Torr (absolute pressure: 5 mmHg) over 30 minutes, and at the same time, the temperature of the reactor was raised up to 280° C. over 1 hour, and the pressure of the reactor was maintained to less than 1 Torr (absolute pressure: 1 mmHg), such that a polycondensation reaction was performed. In the early stage of the polycondensation reaction, a stirring speed was set at a high speed. However, due to the polycondensation reaction, when stirring force is weakened, or a temperature of the mixed product is raised to the set temperature or higher, the stirring speed may be appropriately adjusted. The polycondensation reaction was performed until the intrinsic viscosity (IV) of the mixture (molten material) in the reactor reached 0.55 dl/g. When the intrinsic viscosity of the mixture in the reactor reached a desired level, the mixture was discharged out of the reactor and stranded. The mixture was solidified with a cooling liquid and granulated to have an average weight of about 12 to 14 mg.

The particles were allowed to stand at 160° C. for 1 hour to crystallize, and then put into a 20 L volumetric solid-phase polymerization reactor. Then, nitrogen was flowed into the reactor at a rate of 50 L/min. At this time, the temperature of the reactor was raised from room temperature up to 140° C. at a rate of 40° C./hour, maintained at 140° C. for 3 hours, and then raised up to 200° C. at a rate of 40° C./hour, and maintained at 200° C. The solid-phase polymerization was performed until the intrinsic viscosity (IV) of the particles in the reactor reached 1.1 dl/g.

A residue derived from the terephthalic acid was 100 mol % with respect to a residue derived from a total acid included in the thus-manufactured polyester resin, and a residue derived from the isosorbide was 13 mol %, and a residue derived from ethylene glycol was 84.5 mol %, and a residue derived from diethylene glycol was 2.5 mol % with respect to a residue derived from a total diol.

The peak area ratio of the polyester resin solution to the isosorbide standard solution analyzed by gas chromatography (GC) was 1.20.

Comparative Example 4: Manufacture of Polyester Resin 3824.1 g (19.7 mol) of dimethyl terephthalate, 2444.2 g (39.4 mol) of ethylene glycol, and 748.3 g (5.1 mol) of isosorbide were put into a 10 L volumetric reactor to which a column, and a condenser capable of being cooled by water were connected (a molar ratio of the dicarboxylic acid or the derivative thereof to the diol was 1:2.26).

1.5 g of Mn (II) acetate tetrahydrate and 1.8 g of $Sb_2O_3$ were used as catalysts, 1.1 g of cobalt acetate was used as a coloring agent, and 1 g of phosphoric acid was used as a stabilizer.

Then, nitrogen was injected into the reactor, but the pressure of the reactor was not increased (absolute pressure: 760 mmHg). In addition, a temperature of the reactor was raised from room temperature up to 220° C. over 90 minutes, maintained at 220° C. for 2 hours, and then raised up to 240° C. over 2 hours. Next, a temperature of the reactor was maintained at 240° C. until the mixture in the reactor became transparent by visually observing the mixture. When a transesterification reaction was completed, nitrogen in the reactor in the pressurized state was purged to the outside, thereby reducing the pressure in the reactor to normal pressure. Then, the mixture in the reactor was transferred to a 7 L volumetric reactor in which a vacuum reaction was capable of being performed.

Then, the pressure of the reactor was lowered from normal pressure up to 5 Torr (absolute pressure: 5 mmHg) over 30 minutes, and at the same time, the temperature of the reactor was raised up to 285° C. over 1 hour, and the pressure of the reactor was maintained to less than 1 Torr (absolute pressure: 1 mmHg), such that a polycondensation reaction was performed. In the early stage of the polycondensation reaction, a stirring speed was set at a high speed. However, due to the polycondensation reaction, when stirring force is weakened, or a temperature of the mixed product is raised to the set temperature or higher, the stirring speed may be appropriately adjusted. The polycondensation reaction was performed until the intrinsic viscosity (IV) of the mixture (molten material) in the reactor reached 0.40 dl/g. When the intrinsic viscosity of the mixture in the reactor reached a desired level, the mixture was discharged out of the reactor and stranded. The mixture was solidified with a cooling liquid and granulated to have an average weight of about 12 to 14 mg.

The particles were allowed to stand at 115° C. for 6 hours to crystallize, and then put into a 20 L volumetric solid-phase polymerization reactor. Then, nitrogen was flowed into the reactor at a rate of 50 L/min. At this time, the temperature of the reactor was raised from room temperature up to 140° C. at a rate of 40° C./hour, maintained at 140° C. for 3 hours, and then raised up to 205° C. at a rate of 40° C./hour, and maintained at 205° C. The solid-phase polymerization was performed until the intrinsic viscosity (IV) of the particles in the reactor reached 0.7 dl/g.

A residue derived from the terephthalic acid was 100 mol % with respect to a residue derived from a total acid included in the thus-manufactured polyester resin, and a residue derived from the isosorbide was 6 mol %, and a residue derived from ethylene glycol was 91 mol %, and a residue derived from diethylene glycol was 3 mol % with respect to a residue derived from a total diol.

The peak area ratio of the polyester resin solution to the isosorbide standard solution analyzed by gas chromatography (GC) was 1.20.

Comparative Example 5: Manufacture of Polyester Resin 3142.8 g (18.9 mol) of terephthalic acid, 845.1 g (13.6 mol) of ethylene glycol, and 1050.4 g (7.2 mol) of isosorbide were put into a 10 L volumetric reactor to which a column, and a condenser capable of being cooled by water were connected (a molar ratio of the dicarboxylic acid or the derivative thereof to the diol was 1:1.10).

1.5 g of $GeO_2$ was used as a catalyst, 1.6 g of phosphoric acid was used as a stabilizer, 0.021 g of Polysynthren Blue RLS of Clarient Corp. was used as a blue toner, 0.004 g of Solvaperm Red BB of Clarient Corp. was used as a red toner, and 1 ppm of polyethylene was used as a crystallizer.

Then, nitrogen was injected into the reactor to form a pressurized state in which a pressure of the reactor was higher than normal pressure by 0.2 kgf/cm² (absolute pressure: 907.1 mmHg).

In addition, a temperature of the reactor was raised from room temperature up to 220° C. over 90 minutes, maintained at 220° C. for 2 hours, and then raised up to 260° C. over 2 hours. Next, the mixture in the reactor was visually observed, and a temperature of the reactor was maintained at 260° C. until the mixture became transparent. When an esterification reaction was completed, nitrogen in the reactor in the pressurized state was purged to the outside, thereby reducing the pressure in the reactor to normal pressure.

Then, the mixture in the reactor was transferred to a 7 L volumetric reactor in which a vacuum reaction was capable of being performed.

Then, the pressure of the reactor was lowered from normal pressure up to 5 Torr (absolute pressure: 5 mmHg) over 30 minutes, and at the same time, the temperature of the reactor was raised up to 270° C. over 1 hour, and the pressure of the reactor was maintained to less than 1 Torr (absolute pressure: 1 mmHg), such that a polycondensation reaction was performed. In the early stage of the polycondensation reaction, a stirring speed was set at a high speed. However, due to the polycondensation reaction, when stirring force is weakened, or a temperature of the mixed product is raised to the set temperature or higher, the stirring speed may be appropriately adjusted. The polycondensation reaction was performed until the intrinsic viscosity (IV) of the mixture (molten material) in the reactor reached 0.60 dl/g.

A residue derived from the terephthalic acid was 100 mol % with respect to a residue derived from a total acid included in the thus-manufactured polyester resin, and a residue derived from the isosorbide was 35 mol %, and a residue derived from ethylene glycol was 64 mol %, and a residue derived from diethylene glycol was 1 mol % with respect to a residue derived from a total diol.

The peak area ratio of the polyester resin solution to the isosorbide standard solution analyzed by gas chromatography (GC) was 1.67.

Experimental Example: Evaluation of Polyester Resin

Physical properties of the polyester resins manufactured in Examples 1 to 10 and Comparative Examples 1 to 5 were evaluated according to the above-described methods, and results thereof were shown in Table 1 below.

TABLE 1

| | Intrinsic viscosity [dl/g] in final reaction | Area ratio of remaining isosorbide | Tg [° C.] | Tm [° C.] | Chip color b | Color b of injection molded sample |
|---|---|---|---|---|---|---|
| Example 1 | 0.90 | 0.13 | 81 | 245 | −1.8 | 0.4 |
| Example 2 | 0.80 | 0.13 | 81 | 245 | −1.6 | 0.5 |
| Example 3 | 0.90 | 0.20 | 85 | 236 | −2.5 | 0.3 |
| Example 4 | 0.90 | 0.20 | 85 | 236 | −4.0 | −0.4 |
| Example 5 | 1.00 | 0.27 | 90 | 225 | −4.0 | 0.1 |
| Example 6 | 1.10 | 0.40 | 92 | 220 | −3.5 | 0.3 |
| Example 7 | 0.80 | 0.57 | 100 | — | −4.0 | 0.9 |
| Example 8 | 0.95 | 0.33 | 85 | 236 | −2.0 | 1.0 |
| Example 9 | 0.90 | 0.27 | 85 | 236 | −2.1 | 1.1 |
| Example 10 | 0.80 | 0.40 | 90 | 220 | −3.3 | 0.8 |
| Comparative Example 1 | 0.90 | 1.07 | 85 | 236 | −2.5 | 1.5 |
| Comparative Example 2 | 0.75 | 1.07 | 89 | 225 | −4.0 | 1.2 |
| Comparative Example 3 | 1.10 | 1.20 | 92 | 210 | −3.0 | 1.8 |
| Comparative Example 4 | 0.70 | 1.20 | 85 | 236 | −1.8 | 2.1 |
| Comparative Example 5 | 0.60 | 1.67 | 118 | — | 4.5 | 10 |

Referring to Table 1 above, it could be confirmed that the polyester resins manufactured according to Examples had the color b value of less than 1.2 after the injection molding, such that excellent transparency was exhibited. However, the polyester resins manufactured according to Comparative Examples had the color b value of 1.2 or more after the injection molding, such that yellowing occurred. Therefore, it is expected that the polyester resin according to the exemplary embodiment of the present invention may be molded to provide a high-quality polymer product without discoloration or coloring problems.

The invention claimed is:

1. A manufacturing method for a polyester resin, comprising:
   (a) in the presence of a catalyst, performing an esterification reaction on (i) a dicarboxylic acid that includes a terephthalic acid and (ii) a diol including 0.5 to 25 mol % of isosorbide with respect to a total diol; and
   (b) performing a polycondensation reaction on a product obtained by the esterification reaction,
   wherein an initial mixing molar ratio of the dicarboxylic acid and the diol is between 1:1.02 and 1:1.04,
   wherein the catalyst comprises at least one oxide of an element selected from the group consisting of magnesium, lead, zinc, antimony, and germanium, and
   wherein a color b value of an injection-molded sample of the polyester resin, obtained by injection molding the polyester resin at 290° C., ranges between about −1.0 and 0.5.

2. The manufacturing method of claim 1, wherein:
   a polycondensation catalyst, a stabilizer, a coloring agent, a crystallizer, an antioxidant or a branching agent is added to a slurry before (a) the esterification reaction starts or to the product after (a) the esterification reaction is completed.

3. The manufacturing method of claim 1, further comprising:
   before (b) the polycondensation reaction, allowing the reaction product obtained by the esterification reaction to stand under a reduced pressure of 400 to 1 mmHg for 0.2 to 3 hours.

4. The manufacturing method of claim 1, wherein:
   (b) the polycondensation reaction is performed under a pressure of 400 to 0.01 mmHg.

5. The manufacturing method of claim 1, further comprising:
   after (b) the polycondensation reaction, (c) performing crystallization on a polymer prepared by the polycondensation reaction and (d) performing solid-phase polymerization on the crystallized polymer.

6. The manufacturing method of claim 5, wherein:
   the crystallized polymer obtained after the crystallization of step (c) is washed with water to remove unreacted raw material.

7. The manufacturing method of claim 5, wherein:
   (d) the solid-phase polymerization is performed on the crystallized polymer so that an intrinsic viscosity measured at 35° C. after being dissolved in ortho-chlorophenol at a concentration of 1.2 g/dl at 150° C. for 15 minutes reaches 0.80 dl/g or more.

* * * * *